United States Patent [19]

Ropp

[11] 4,049,779
[45] Sept. 20, 1977

[54] CRYSTALLINE SALT MONOMERS FOR STABLE PHOSPHATE GLASSES

[75] Inventor: Richard C. Ropp, Warren, N.J.

[73] Assignee: Allied Chemical Corporation, Morris Township, N.J.

[21] Appl. No.: 644,270

[22] Filed: Dec. 24, 1975

[51] Int. Cl.² .................. C01B 15/16; C01B 25/26; C03C 3/00
[52] U.S. Cl. .................. 423/309; 423/311; 23/300; 106/47 R
[58] Field of Search .......... 423/305, 307–313; 106/47 P, 47 B; 423/314, 315; 23/300, 305 R, 305 A, 305 F

[56] References Cited

U.S. PATENT DOCUMENTS

| 2,914,380 | 11/1959 | Vickery | 423/305 |
| 3,384,453 | 5/1968 | Kauders | 423/309 |
| 3,862,298 | 1/1975 | Beltz et al. | 423/321 S |

FOREIGN PATENT DOCUMENTS

| 173,727 | 12/1934 | Switzerland | 423/321 |
| 270,820 | 3/1937 | United Kingdom | 423/309 |

*Primary Examiner*—O. R. Vertiz

*Attorney, Agent, or Firm*—Arthur J. Plantamura; Ernest A. Polin

[57] ABSTRACT

Precursors for the preparation of phosphate glasses are provided. Controlled preparation of the precursors in precise stoichiometric proportions enable the preparation of glasses which are stable and possess superior optical properties of an order similar to optical glasses. Suitable precursors within the contemplation of the invention are those having the formula:

$$M(H_2PO_4)_n$$

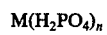

wherein M is a metal ion selected from the group consisting of Al, Zn, Cd, Fe, Sn, Mn, Pb, Ni, Co, Ga, and In and the alkaline earth metals Be, Mg, Ca, Sr and Ba and wherein $n$ has a value of 2 or 3 depending on whether M is a divalent or trivalent ion. Mixtures of these compounds may be employed, the admixture being made prior to melting stoichiometric equivalent precursor mixture. In addition, any combination of precursors containing divalent and/or trivalent cations may be selected.

19 Claims, No Drawings

CRYSTALLINE SALT MONOMERS FOR STABLE PHOSPHATE GLASSES

CROSS REFERENCE TO RELATED APPLICATION

The present application claims subject matter disclosed in my prior copending application Ser. No. 633,776, filed Nov. 20, 1975.

BACKGROUND OF THE INVENTION

Attempts to make phosphate glasses in a chemically stable form by methods employed in the prior art have been largely unsuccessful. Typical of such prior art systems in which phosphates are employed are those processes set forth in U.S. Pats. Nos. 2,434,281; 2,031,579; 2,064,344 and 3,485,646. The compositions utilized in those patents is $P_2O_5$ or $H_3PO_4$ or $HPO_3$. Compounds which decompose to the oxide to form a compound such as $NaPO_3$ and $Al(PO_3)_3$ have also been prepared from $HPO_3$ which are then used to prepare the glass. However, the prior art systems and/or methods do not recognize the criticality in obtaining a glass product of desired properties by preparing precursor compounds, to be melted to form the glass, in essentially pure stoichiometric monobasic form prior to melting the compounds. Nor do these prior art systems and/or methods recognize the criticality of reacting the precursor monobasic compounds in a thermal process to obtain a melt which is further reacted to form stable phosphate glasses when appropriately cast and annealed.

SUMMARY OF THE INVENTION

In accordance with the invention, phosphate glasses are prepared by first preparing monobasic phosphate precursor compounds of stoichiometric equivalent substantially free of phosphoric acid and impurities and then using these precursors to form the melt for the desired glass. The precursor compounds within the scope of the invention are represented by the formula:

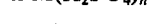
ti $M(H_2PO_4)_n$ wherein M is a metal ion of the group consisting of aluminum, zinc, cadmium, iron, tin, manganese, lead, nickel, cobalt, gallium, indium, and the alkaline earth metals, beryllium, magnesium, calcium, strontium and barium and wherein n has a value of 2 or 3 depending on whether M is a divalent or trivalent ion. Depending on the particular precursor, it may, or may not, contain waters of hydration.

In the preparation of the precursors of the invention a recrystallization from solution is employed both to obtain purification and high crystallinity. The reagent of choice in the preparation of these salts is $H_3PO_4$. The cation, in the form of oxide, hydroxide, or carbonate, is dissolved in dilute $H_3PO_4$; once dissolution is obtained, the solution is purified by suitable conventional means. The monomer is soluble in the $H_3PO_4$-$H_2O$ solution and the solution is carefully evaporated to effect both crystallization and purification to exclude impurities such as iron. However, at elevated temperatures, the monomer is also subject to a disproportionation to form a dibasic compound, $MHPO_4$. In most cases the dibasic compound is insoluble and its formation must be avoided. The solid precursor free of the dibasic compound and of phosphoric acid is isolated and then melted by heating to elevated temperature whereupon the precursor compound reacts chemically, i.e. undergoes intrareaction, and forms a substantially homogeneous melt; the melt is retained at elevated temperatures until reaction of said precursor is essentially complete, i.e. until essentially complete condensation and/or polymerization has occured. The melt is then cast and the formed glass is annealed. The phosphate glass so obtained exhibits marked improvement in chemical durability over known prior art glasses of similar composition.

DESCRIPTION OF THE PREFERRED EMBODIMENTS

One of the major properties adversely affecting the commercial usage of the non-silicate glasses is chemical durability. Chemical durability of a glass is usually defined in terms of the rate of chemical etching of the surface by a liquid such as boiling water. A convenient reference is the durability or weight loss of plate glass (soda lime silicate) in boiling water which is 0.053 mg/cm²/hr. I have discovered, for example, that phosphate glasses prepared according to the present invention exhibit marked improvement in chemical durability and rival those of the silicate-based glasses. This is a highly significant order of change in the chemical durability of phosphate glasses which has not been achieved heretofore. For example, the prior art quotes durabilities for phosphate glasses ranging from 2.2 to 83 mg/cm²/hr. For a calcium phosphate glass prepared according to the invention, I have achieved a durability of 0.11 mg/cm²/hr. while an aluminum phosphate glass prepared according to the invention showed a durability of 0.000054 mg/cm²/hr. Magnesium phosphate glass exhibits a durability of 0.084 mg/cm²/hr. These values are improved generally in the order of at least ten to as much as a thousand times over the durabilities of the prior art.

In accordance with the invention I have found that, for non-silicate glasses such as those based upon phosphates it is desirable to form a stoichiometric compound, i.e. a precursor of specific proportions, which is substantially freed of phosphoric acid and impurities and then used to form the melt to produce the desired glass. The resulting glass thereby exhibits properties not normally found for similar glasses of melts prepared otherwise.

The present invention in essence utilizes selected precursor compounds of stoichiometric proportions which are melted to form a glass. Such precursors with the contemplation of the invention are those having the formula:

$M(H_2PO_4)_n$ wherein M is a metal ion selected from the group consisting of Al, Zn, Cd, Fe, Sn, Mn, Pb, Ni, Co, Ga and In and the alkaline earth metals Be, Mg, Ca, Sr and Ba and wherein n has a value of 2 or 3 depending on whether M is a divalent or trivalent ion. Mixtures of these compounds may also be employed, the admixture being made prior to melting stoichiometric equivalent precursor mixture. In addition, any combination of precursors containing divalent and/or trivalent cations may be selected, although it is preferred to prepare the divalent and/or trivalent precursor compounds separately and then to combine them in desired proportion prior to the melting procedure.

The glasses prepared from the precursor compounds of the invention possess unexpected optical properties in which optical transmission substantially equal to quartz in the ultraviolet region of the spectrum, coupled with physical properties more similar to the optical glasses currently used in the optical industry (including low melting point, high refractive index, and others) are achieved by utilizing a cation having no absorption in the ultraviolet region, except below about 1600A; these glasses include those cation metals mentioned above in combination with the phosphate anion, excepting Fe, Sn, Mn, Pb, Ni, and Co, which do absorb in certain regions of the spectrum. The phosphate absorbs below about 1850A.

When an ultraviolet transmitting glass is desired, only Be, Mg, Ca, Sr, Ba, Zn, Cd, Al, Ga and In can be used as the metal in phosphate glass. The metals, Fe, Sn, Mn, Pb, Ni and Co must be avoided and if a far-ultraviolet glass is desired, then the metal must be restricted to the group: Be, Al, Ca, Sr and Ba. Furthermore, the metal monobasic phosphate selected from this group must be purified to remove the transition metals to a purity level having no more than 100 ppm total impurities.

A suitable method of purification is as follows. The selected cation as the carbonate, $MCO_3$, or the hydroxide, $M(OH)_2$ is dissolved in an excess of $H_3PO_4$. The resulting solution is suitable filtered such as through a 0.45 micron filter to remove particulate impurities. Ten grams of suitable precipitant e.g. ammonium 1-pyrrolidinedithio-carbamate (APC) are weight out, dissolved in 50 ml of water, and added to about four liters of the solution. A precipitate forms which is removed by filtration through the 0.45 micron filter.

The steps in the preparation of a typical compound suitable for preparing a phosphate glass of improved properties over those of the prior art, in accordance with the invention are summarized as follows:

1. The compound, e.g. $MCO_3$ wherein M is defined as above, is dissolved in the appropriate acid, e.g. $H_3PO_4$. A 50% excess of acid is required to prevent formation of the dibasic salt, a form which is to be excluded from the finished monobasic salt used to make the glass.

2. The solution is purified so that impurities are no more than about 10 ppm. Exclusion of iron, cobalt, and nickel impurities is important, as is the exclusion of transition elements which absorb in the U.V. spectrum. By controlling the impurities, it has been discovered that it is possible to control the glass transmission from about 1850A down to 26,000A. Suitable purification methods include the use of ultrafiltration using filters permitting practical filtration times e.g. having openings of about 0.45 microns or smaller, combined with the use of precipitants of soluble transition metals as selected from the group: a. ammonium 1-pyrrolidinedithio carbamate (APC) b. ammonium nitrosophenylhydroxylamine (cupferron) c. ammonium polysulfide d. dimethylglyoxime e. 8-hydroxyquinoline. These reagents are listed in order of their versatility, the first two being preferred. A specific quantity of the selected precipitant is measured, dissolved, and added to the solution to cause the transition metals to form insoluble precipitates. All except 8-hydroxyquinoline and dimethylglyoxime are water soluble. These last two precipitants must be dissolved in chloroform and the resulting immiscible solution is used to extract the impurities from the aqueous solution into the chloroform solution. In the case of the sulfide precipitant, it is better to wait 2-4 days to allow the precipitate to coagulate. The impurity precipitates are then removed by ultrafiltration through a 0.45 micron filter. The aqueous solution is then ready for evaporation.

3. The purified solution is evaporated to obtain crystals. In general the impurities concentrate in the liquid as the crystals are formed. This excess liquid is discarded and the crystals are washed in a suitable organic solvent, e.g. acetone to remove excess $H_3PO_4$, in the case of the phosphate glass. The evaporation process can utilize a steam bath with a slowly rotating stirrer. It is important to avoid the formation of a dibasic compound, $MHPO_4$.

In nearly all cases, the $MHPO_4$ compound is insoluble in water, said condition acting as a driving force for the reaction. The presence of the dibasic compound lowers the yield of the monomer and the presence of even a trace of the dibasic salt hinders the formation of a suitable melt to form a stable phosphate glass of the desired durability and stability. To prevent the disproportionation, I have found that it is necessary to add excess $H_3PO_4$ to the soluble monomer solution prior to the evaporation step. For divalent cations the minimum ratio must be: $H_3PO_4:M^{2+} = 2.50:1.00$. For trivalent cations, the minimum ratio must be: $H_3PO_4:M^{3+} = 6.00:1.00$. For the former the optimum ratio is about 3.00:1.00 whereas for the latter, the optimum ratio is about 7.00:1.00. The crystals from the evaporating step are found to be mixed with $H_3PO_4$ which is objectionable since, in the subsequent preparation of the glass, this excess $H_3PO_4$ reacts and is incorporated into the glassy matrix. The resulting glass is much less stable than the glass prepared from a stoichiometric salt. Thus in accordance with the present invention, essentially complete removal of the excess acid is necessary for the preparation of a high durability phosphate glass.

The problem resolves itself into the fact that both the monomer and the excess $H_3PO_4$ are water soluble. I have found that certain non-aqueous solvents will preferentially dissolve the $H_3PO_4$ leaving a crystalline salt. Such solvents include the following: acetone, methyl ethyl ketone, methyl acetate, ethyl acetate, n-butanol. In general, the ketones, acetates, and higher molecular-weight alcohols are suitable for $H_3PO_4$ dissolution. However, I have determined that for the divalent salt precursors, acetone remains the best washing agent. The excess $H_3PO_4$ is completely removed by appropriate steps in the washing procedure. In addition, I have found that the residual acetone is easily removed by baking at 100° C., a temperature at which the crystal salts are not affected but at which the acetone is completely removed by evaporation. The higher molecular weight acetates and alcohols leave small residues behind which are impractical to remove completely. During the melting step, when the monomer is heated to form a melt, these impurities burn off leaving residual carbon particles behind which affect the quality of the glass produced.

Acetone is not a suitable washing agent for the divalent transition-metal salts or the trivalent cation salt monomers. These salts appear to be more soluble, and in some cases dissolve completely in acetone. I have determined that the washing agent of choice for these divalent transition-metal cation salt monomers or the trivalent cation salt monomers is methyl ethyl ketone. The excess $H_3PO_4$ can be completely separated from the crystalline salt and the methyl ethyl ketone can be completely removed similarly as in the case of acetone for the divalent-cation salt monomers by baking at 100° C.

4. The pure crystals derived from solution, i.e. the precursors, form the basis of the glass formation. They can be melted directly or mixed with the appropriate oxide and the mixture is melted to form a substantially homogeneous glass of predetermined composition containing no more than about 10 ppm of impurities. However, it is to be noted that selected impurities can be added to impart desirable properties in the finished glass. A melt hold time of sufficient duration is utilized to effect full reaction, i.e., essentially complete polymerization, to provide the desired chemical durability.

Various modifications may be employed in preparing the glasses of the invention. The major criteria which must be observed, however, are: 1) purity of the finished glass, and 2) establishing polymerization in the solid state of a series of compounds, each of which reacts to form a polymer of increasing complexity, to form chains and/or cyclic polymers in the glassy state.

When the precursor monomer compound is produced according to the invention and used to manufacture a glass, it is found that the product is much more stable than phosphate glasses of the prior art. Also instability is found to be a function of the amount of excess $H_3PO_4$ present during preparation as shown in the following table wherein durability is measured in terms of milligrams lost per square millimeter of exposed surface per hour.

| $Ca(PO_3)_2$ Glass | Excess $H_3PO_4$ | Chemical Durability in mg/cm$^2$/hr. |
|---|---|---|
| (a) Prior Art | not known | 2.2 to 24.0 |
| (b) Washed crystals | +100% | 2.20 |
| (c) Unwashed crystals | none (25% present) | 0.63 |
| (d) Washed crystals | +5% | 0.53 |
| (e) Washed crystals | None (0.09% present) | 0.18 |

It is evident that the stability of the produced glasses is related to the amount of excess $H_3PO_4$ present in the original monomer salt. For example, in the analysis of salt suitable for production of stable polymeric $[Ca(PO_3)_2]_n$ glass I have found it to consist of:

| | |
|---|---|
| 0.12% | absorbed $H_2O$ |
| 99.79% | $Ca(H_2PO_4)_2 \cdot H_2O$ |
| 0.09% | $H_3PO_4$ |

It is important to obtain substantially pure monobasic crystals free of dibasic compounds and $H_3PO_4$. The $H_3PO_4$ must be kept to an absolute minimum in order to control the degree and extent of cross linking of the final polymerized phase. $H_3PO_4$ present during initial dehydration and condensation imparts hydroxyl groups which inhibit and limit chain length in the polymer. If the chain length is too short, then the polymerized glass is not stable to subsequent hydrolysis and does not exhibit the superior properties of the present invention.

In the case of $Al(PO_3)_3$ glass I have found it expedient to prepare a crystalline salt $Al(H_2PO_4)_3$ by evaporation of a purified solution of $Al^{+3}$ in $H_3PO_4$ at a 1:7 ratio. While the salt can be obtained in a pure form by washing the crystals in methyl ethyl ketone, I have also found that a pure salt intermediate is obtained if the mixture is fired for several hours at 1150° C. At this temperature the $H_3PO_4$ dissociates to $P_2O_5$ and $H_2O$, both volatizing away leaving a pure $Al(PO_3)_3$ intermediate. This material is then melted to form a glass of high durability.

The melting temperature of the pure $Ca(PO_3)_2$ glass is about 960° C. and the softening point is about 580° C. The refractive index is 1.54 and the expansion coefficient is about 94.0 × 10$^{-7}$ in/in/degree C. The glass can be sealed to G-12 glass envelopes to form a U.V. transmitting faceplate for cathode ray tubes. In view of their relatively high chemical durability, the glasses derived from the precursors of the present invention are superior in many respects. For example, the phosphate glasses have the following distinct advantage over quartz: 1) They can be handled at relatively low temperatures (700°-800° C.); 2) They can be sealed easily and for tighter seals than many of the other optical glasses, including quartz; 3) They are transparent in the U.V. and visible regions of the spectrum, unlike the optical glasses but similar to quartz; 4) The refactive index of the glass can be varied by addition of selected rare earths, as is known in the art, including La, Gd, and Yb, up to about 25 mol %, and up to about 2.10 refractive index; 5) They are amenable to all mechanical operations including grinding and polishing operations.

It is to be noted that purity of the raw materials used in making the melt is a major consideration and the precursors so produced preferably should not contain more than about 1 to 10 ppm of impurities. A glass prepared therefrom transmits ultraviolet rays and has a cutoff of about 2000A for $Ca(PO_3)_2$ glass.

In preparing the glass it is necessary to initiate a condensation and/or polymerization reaction of the ortho-phosphate anions and it is essential that this be done by a series of reactions which start with the monobasic salts of these compounds, e.g. $M(H_2PO_4)_2$, which may or may not be hydrated. The degree of hydration is of little importance since the water is driven off during the glass formation.

Most of the monobasic salts are soluble in water and/or an acid aqueous solution and are isolated therefrom by evaporation techniques. Conventional methods of preparation are suitable if impurities are not introduced into the finished salts. The dried salt isolated from solution is melted in an inert crucible in air. Depending upon the nature of the metal M, it appears that the initial reaction forms the pyrophosphate (i.e. — two phosphate tetrahedra become hooked together). The succeeding reaction involves formation of a ring structure. (i.e. — tetrametaphosphate, $M_3P_4O_{13}$, depending upon the nature of the metal M). The ring structure may contain up to 6 or 8 phosphate tetrahedra hooked together. This occurs during the initial stages of the reaction which is in effect a polymerization reaction. At elevated temperatures it appears that the rings open to form long chain linear or cyclic polymers. It will be understood that the invention is not to be limited by the foregoing theoretical observations. The melt may then be cooled by conventional technique to form a glass suitable for electronic and optical applications.

Various compositions of $M(PO_3)_2$ or $M(PO_3)_3$ are possible. These compositions have various valuable application such as in optical areas. For example $Ba(PO_3)_2$ glass containing some Sr and Cd appears to be very suitable for casting discs or for pressed optical components. $Ca(PO_3)_2$ compositions make fibers with excellent physical characteristics.

The invention will be further described by the following specific examples. It will be understood, however, that although the examples detail certain specific compositions and conditions of the invention, they are provided primarily for purposes of illustration and the invention in its broader aspects is not limited thereto. Unless expressly stated otherwise, parts expressed are parts by weight.

EXAMPLES I-III Calcium Phosphate Salt

I.

a. Prepare a solution of $H_3PO_4$ in water by adding approximately 3.00 mols $H_3PO_4$ (210 ml) to 600 ml $H_2O$ and dilute to 1000 ml total volume; 85% $H_3PO_4$ - reagent grade is used.

b. Weigh out 100.1 gm $CaCO_3$ and slowly dissolve in $H_3PO_4$ solution.

c. Weigh out 2.5 gm of ammonium 1-pyrrolidine dithiocarbamate (APC) and dissolve in 50 ml of water. Add this solution to the phosphate solution. A dark grey precipitate forms.

d. Filter the solution through a 0.45 micron filter to remove the precipitate.

e. The purified solution is evaporated slowly, using a steam bath, if desired, to obtain crystals plus a liquor. The liquor is $H_3PO_4$ plus a small amount of $H_2O$. The excess liquor is decanted and the crystals are washed in acetone, or other suitable solvent by a suspension and decantation procedure to remove all of the excess acid. Even a very small amount of $H_3PO_4$ left in the crystals tend to produce a glass which is not stable to hydrolysis. The resulting crystals have a total impurity content of 100 - 200 ppm.

II.

Alternately, if a crystaline salt of higher purity is desired, the following purification procedure is used. Step (a) is followed by step (c) and the resulting solution is filtered as in step (d). Then the $CaCO_3$ is added as in step (b) and steps (c) and (d), are again performed prior to the evaporation step (e). The resulting crystals have a total impurity content of 10–20 ppm.

III. If an even higher degree of purity is desired, then the procedure of (II) is again followed and the resulting solution is placed in an electrolysis unit equipped with a stirred mercury pool cathode, a gas diffuser for introduction of nitrogen bubbles into the solution, and a platinum anode. The nitrogen gas is turned on and the solution is electrolyzed at −2.75 volts direct current at the mercury pool for a time sufficient to remove ionic metallic impurities. Step (e) is then followed. The resulting crystals have a total impurity content of less than 1 ppm.

f. The crystals of the monobasic salt of (I), (II) and (III) are placed in a clean alumina crucible of suitable size and heated to 1000° C. to cause chemical condensation and polymerization to proceed. The salt decomposes, condenses, and polymerizes to form a clear glassy melt. The melt is held in air for at least 72 hours to complete polymerization. The clear glass melt is then cast in desired shapes and processed to relieve internal stress by annealing.

g. Alternately, the crystals are placed in an alumina crucible and the temperature is programmed through temperature steps corresponding to chemical reactions and condensations as determined by differential thermal analyslis. The reaction products are then melted by increasing the temperature to 1050° C. and then processed according to step (f) to cause complete reaction. The programming procedure prior to melting markedly increases the durability of the obtained glass.

EXAMPLE IV — Strontium Phosphate Salt a. The general steps of Examples I-III are followed except that in the case of strontium phosphate glass, 147.63 gm $SrCO_3$ are substituted for the $CaCO_3$ in step (b) of the prior examples.

b. Following the evaporation procedure of step (e) in Examples I-III the excess liquor is poured out and the crystals are washed in acetone by suspension and decantation until the excess phosphoric acid is removed.

c. Depending upon degree of purity desired, any of the purification procedures of Examples I-III can be used.

d. The general procedures of steps (f) and (g) of the prior examples are then followed to prepare a strontium phosphate glass of high chemical durability, as compared to those glasses of the prior art.

EXAMPLE V — Barium Phosphate Salt a. The general procedures of Example IV are followed except that 197.35 gm $BaCO_3$ are substituted for the $SrCO_3$ of step (b) of that example.

b. Following the evaporation step, the crystals are washed in acetone to remove excess phosphoric acid.

c. The crystals are then melted according to the procedures of the prior examples to form a substantially homogeneous melt which is allowed to undergo condensation and/or polymerization until reaction is complete.

d. For the barium phosphate salt, the temperatures of reaction are lower than those of calcium phosphate salt and the melt is obtained at a lower temperature of about 925° C. Care must be exercised not to allow the melt temperature to rise over about 1200° C., since phosphorous in the melt is lost as volatile $P_2O_5$, thereby degrading the quality of the so-obtained glass.

EXAMPLES VI — Magnesium Phosphate Glass a. The general procedures of Examples I-III are followed except that in step (b), 84.32 gm of $MgCO_3$ are substituted for the $CaCO_3$.

b. In following the evaporation procedure (e) of Examples I-III, it is found that crystals of magnesium monobasic phosphate trihydrate do not form easily. Therefore the procedure is modified as follows: The solution obtained from step (d) (Examples I-III) is evaporated on a steam bath until about 80% of the volume is lost. The remaining 20% of the solution is then cooled and placed in a separate container to crystallize. After about 48 hours, the liquid condenses into a solid mass of crystals.

c. Because the magnesium phosphate salt does not form a homogeneous melt below about 1100° C., it is not necessary to remove excess $H_3PO_4$. During the evaporation process, the excess phosphoric acid forms a eutectic compound of $7H_3PO_4.3H_2O$ which boils at about 866° C.

For the case of calcium phosphate glass which melts at about 935° C., a substantial amount of the eutectic compound remains at the 935° C. melting point, and is incorporated into the glassy melt.

For the case of the magnesium phosphate glass, all of the eutectic can be boiled off before the glassy melt obtains. Therefore it is not necessary to remove the excess $H_3PO_4$ prior to the condensation and melting procedure to obtain a substantially homogeneous melt.

Therefore the crystals plus liquid are placed on a filter and the liquid is removed by suction to a degree of practical necessity as desired.

d. The wet salt is placed in a crucible and the temperature is raised slowly to about 950° C. whereupon the eutectic compound vaporizes and is lost. The temperature is held at 950° C. until all of the excess acid-water eutectic is substantially lost from the crucible containing the magnesium phosphate salt, whereupon the temperature is raised to about 1100° C to obtain a homogeneous melt. This melt is then processed further as given in Example I–III.

e. If it is desired to obtain crystals free from excess $H_3PO_4$ the magnesium phosphate salt can be washed by suspension and decantation in methyl ethyl ketone. The salt is then processed as before.

EXAMPLE VII — Beryllium Phosphate Salt a. The procedures of Example VI are followed except that 56.03 gram $BeCO_3.Be(OH)_2$ are substituted for the $MgCO_3$.

b. Since beryllium is known to be a toxic element, proper precautions regarding prevention of ingestion by humans are maintained. Once the beryllium is in the form of phosphate glass, its toxicity is considerably lowered as compared to solution and melt forms encountered during processing to form the glass.

EXAMPLE VIII — Aluminum Phosphate Glass a. Prepare a $H_3PO_4$ solution by adding 485 ml of 85% $H_3PO_4$ (reagent grade) to 500 ml $H_2O$. Dilute to 1000 ml total volume. This solution may be purified according to methods given in Examples I–III.

b. Weigh out 78.00 gm $Al(OH)_3$ and dissolve in $H_3PO_4$ solution.

c. Purify resulting solution by techniques of Examples I–III.

d. Evaporate to obtain crystals of aluminum monobasic phosphate, according to techniques of Examples I–III.

e. Since the glassy melt is not obtained much below 1350° C., it is not necessary to remove the excess liquid acid by washing techniques. The prefixing schedule of Example VI(d) is preferred except that the final temperature to obtain a melt is 1350° C instead of 1100° C.

f. The substantially homogeneous melt is held at 1350° C. for a time required to effect complete intrareaction and polymerization of the melt. The melt is then cast and annealed to form an aluminum phosphate glass with markedly improved properties over that of the prior art.

g. The same general techniques may be used for indium or gallium except that 165.84 gm $In(OH)_3$ or 120.74 gm $Ga(OH)_3$ are substituted for the $Al(OH)_3$ in step (b).

EXAMPLE XI — Zinc and Cadmium Phosphate Glasses a. The general technique of Examples I–III are used except for the following exceptions:

b. Select the desired phosphate and substitute one of the following for the $CaCO_3$ of Example I:

| | |
|---|---|
| 81.37 gm | ZnO |
| 172.41 gm | $CdCO_3$ |
| 267.20 gm | $PbCO_3$ |

Dissolve in the $H_3PO_4$ solution to form a completely homogeneous solution.

c. In the case of zinc or cadmium solutions, the use of cupferron is recommended as an organic precipitant in place of APC since the latter forms insoluble precipitates with these two ions. Cupferron only partially precipitates these ions and can be used successfully to purify either of these solutions.

d. Following solution purification, the salts of Cd or Zn are prepared in the manner of Examples I–III.

e. The crystals of Cd or Zn monobasic phosphates cannot be washed in acetone since they are soluble therein, but methyl ethyl ketone can be used successfully to remove the excess acid to obtain a purified salt, as described in Examples I–III.

f. The glasses are prepared as given in Examples I–III, except that the temperatures critical for Cd, or Zn, monobasic salts, as predetermined by differential thermal analysis, are employed.

EXAMPLE X — Sn, Mn, Fe, Co and Ni Phosphate Glasses a. Select one of the above glasses and substitute the following for $CaCo_3$ in Examples I–III.

| | gm |
|---|---|
| SnO | 134.69 |
| $MnCO_3$ | 114.95 |
| $NiCO_3$ | 118.72 |
| $CoCO_3$ | 118.94 |
| $FeCO_3.H_2O$ | 133.86 | b. Prepare a $H_3PO_4$ solution, in Examples I–III, except that 276 ml of $H_3PO_4$ are used.

c. Add the appropriate quantity for the selected cation compound as given in step (a), and dissolve.

d. Filter the solution through a 0.45 micron filter.

e. Purification of these solutions is difficult with the organic reagents cited in prior examples. 8-hydroxyquinoline in $CHCL_3$ may be used as an extractant to achieve partial purification. Four grams of 8-hydroxyquinoline are dissolved in 1000 ml of $CHCL_3$ and the two immiscible solutions are shaken together, allowed to separate, and the $CHCL_3$ extract is removed and discarded.

f. The selected solution is then evaporated to obtain crystals, as in Examples I–III. Since the obtained crystals are soluble in acetone, they are alternately washed in either methyl acetate, ethyl acetate or n-butanol to remove the excess acid to obtain purified crystals. The last named solvent is preferred.

g. The obtained salt is melted under conditions similar to Examples I–III. However, in the case of tin, manganese, iron, nickel and cobalt, precaution should be exercised to prevent oxidation of these ions to the trivalent state, e.g.: $Mn^{+2} \rightarrow Mn^{+3}$, in air at elevated temperatures. Therefore, the obtained monobasic compounds prepared by methods given in the above steps are reacted under a blanket of neutral gas such as nitrogen, neon or argon, or alternately melted in a vacuum furnace, to prevent the oxidation from the divalent to the trivalent metal during the condensation and polymerization procedures in forming the polymerized glass melt. After polymerization is complete, those glasses subject to becoming oxidized during glass preparation by virtue of containing either $Fe^{+2}$, $Sn^{2+}$, $Mn^{2+}$, $Ni^{2+}$ or $Co^{2+}$ have become relatively stable and the glass melts may be removed into the air while still molten and hot, and cast and thermally annealed in the normal manner.

Although I have described but a limited number of products and methods for preparation according to the present invention, it will be apparent to those skilled in the art that variations in both compositions and methods may be effected within the spirit of the invention. Accordingly, the invention is not to be limited except as required by the claims which follow.

I claim:
1. A method of preparing a water soluble monobasic phosphate glass precursor having the formula:

$$M(H_2PO_4)_n$$

wherein M is a metal ion selected from the group consisting of aluminum, zinc, cadmium, iron, tin, manganese, lead, nickel, cobalt, gallium, indium and the alkaline earth metals beryllium, magnesium, calcium, strontium and barium, and wherein $n$ has a value of 2 or 3 depending on whether M is a divalent or trivalent ion, in essentially pure monobasic form which comprises dissolving a compound supplying said metal ion M in a controlled excess of phosphoric acid to form a stoichiometrically proportioned solution, adding a precipitating agent, effective to precipitate soluble transition metal impurities other than the selected metal ion removing formed insolubles to produce an essentially pure solution, forming a crystal product from the resulting purified solution by evaporation, and washing said crystal product substantially free of phosphoric acid to yield a stoichiometrically proportioned crystalline phosphate salt.

2. The method of claim 1 wherein the crystal product is selected from the group consisting of cobalt, iron, nickel, manganese and tin monobasic phosphate salts.

3. The method of claim 1 wherein the ratio of $H_3PO_4/M$ is at least 2.5 for divalent cations and 6.0 for trivalent cations, purifying said solution by precipitation of impurities with said precipitating agent and removal by ultrafiltration, evaporating said solution to obtain a crystalline product, and washing said crystalline product with a suitable organic solvent to remove substantially all of the excess phosphoric acid present as a by-product of the process to produce said crystals in a substantially pure form.

4. The method of claim 1 wherein M is calcium.
5. The method of claim 1 wherein M is strontium.
6. The method of claim 1 wherein M is barium.
7. The method of claim 1 wherein M is magesium.
8. The method of claim 1 wherein M is beryllium.
9. The method of claim 1 wherein M is aluminum.
10. The method of claim 1 wherein M is zinc.
11. The method of claim 1 wherein M is cadmium.
12. The method of claim 1 wherein M is tin.
13. The method of claim 1 wherein M is manganese.
14. The method of claim 1 wherein M is iron.
15. The method of claim 1 wherein M is cobalt.
16. The method of claim 1 wherein M is nickel.
17. The method of claim 1 wherein the compound supplying said metal ion M is a carbonate.
18. The method of claim 1 wherein the compound supplying said metal ion M is a hydroxide.
19. The method of claim 1 wherein the compound supplying said metal ion M is an oxide.

* * * * *

UNITED STATES PATENT AND TRADEMARK OFFICE
CERTIFICATE OF CORRECTION

PATENT NO. : 4,049,779
DATED : September 20, 1977
INVENTOR(S) : Richard C. Ropp

It is certified that error appears in the above-identified patent and that said Letters Patent are hereby corrected as shown below:

Column 1, line 41, "ti $M(H_2PO_4)_n$ should read -- $M(H_2PO_4)_n$ --.

Column 3, line 24, "suitable" should read -- suitably --.

Column 3, line 27, "weight" should read -- weighed --.

Column 5, line 22, "wherein durability" should read -- wherein chemical durability --.

Column 11, line 24, "execess" should read -- excess --.

Signed and Sealed this

Thirtieth Day of May 1978

[SEAL]

Attest:

RUTH C. MASON
Attesting Officer

LUTRELLE F. PARKER
Acting Commissioner of Patents and Trademarks